United States Patent [19]
Bond

[11] Patent Number: 5,048,597
[45] Date of Patent: Sep. 17, 1991

[54] LEAK-SAFE HYDROGEN/AIR HEAT EXCHANGER IN AN ACE SYSTEM

[75] Inventor: William H. Bond, Del Mar, Calif.

[73] Assignee: Rockwell International Corporation

[21] Appl. No.: 452,133

[22] Filed: Dec. 18, 1989

[51] Int. Cl.$^5$ .................. F02K 11/00; F02K 9/00; F02K 9/42; F02K 9/72

[52] U.S. Cl. ........................... 165/41; 165/70; 165/141; 165/160; 60/257; 60/260; 60/267

[58] Field of Search ............... 165/70, 141, 160, 47, 165/41; 60/257, 260, 267, 270.1, 728

[56] References Cited

U.S. PATENT DOCUMENTS

| | | | |
|---|---|---|---|
| 2,658,728 | 11/1953 | Evans, Jr. | 165/70 |
| 3,040,520 | 6/1962 | Rae | 60/260 |
| 3,756,024 | 9/1973 | Gay | 60/257 |
| 3,768,254 | 10/1973 | Stuart | 60/260 |
| 3,775,977 | 12/1973 | Builder et al. | 60/267 |
| 4,090,554 | 5/1978 | Dickinson | 165/70 |
| 4,612,976 | 9/1986 | Soucille et al. | 165/70 |
| 4,782,655 | 11/1988 | Weber | 60/728 |

FOREIGN PATENT DOCUMENTS

| | | | |
|---|---|---|---|
| 268833 | 2/1913 | Fed. Rep. of Germany | 165/70 |
| 2440532 | 3/1975 | Fed. Rep. of Germany | 165/70 |
| 2603693 | 3/1988 | France | 165/70 |

*Primary Examiner*—John Ford
*Attorney, Agent, or Firm*—Charles T. Silberberg; Max Geldin

[57] ABSTRACT

In a heat exchanger system wherein a primary conditioning fluid is reactive with a fluid to be conditioned, a leak safe arrangement of concentric tubes disposed across the conditioned fluid flow path having the reactive primary fluid in a central duct surrounded by inert fluid in an outer duct so that single failure leak of primary conditioning fluid or inert fluid presents no risk of harmful reaction with conditioned fluid. The heat exchanger system is used in an air collection and enrichment system in a hypersmic vehicle propulsion system.

3 Claims, 2 Drawing Sheets

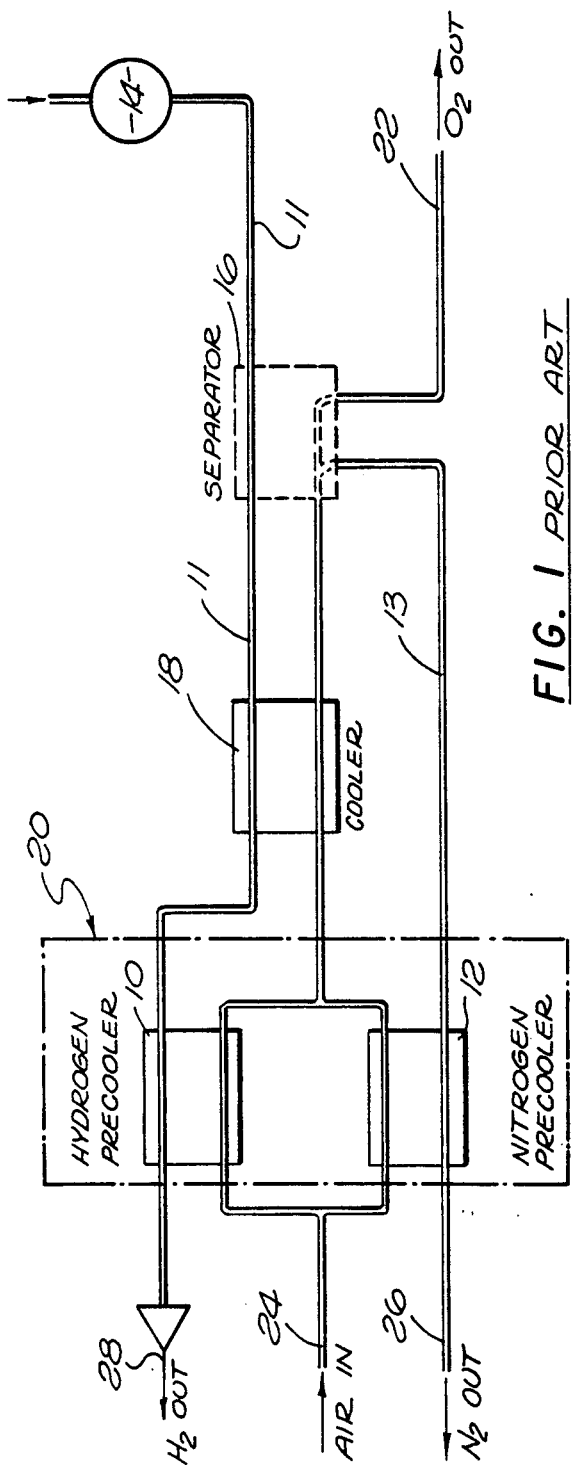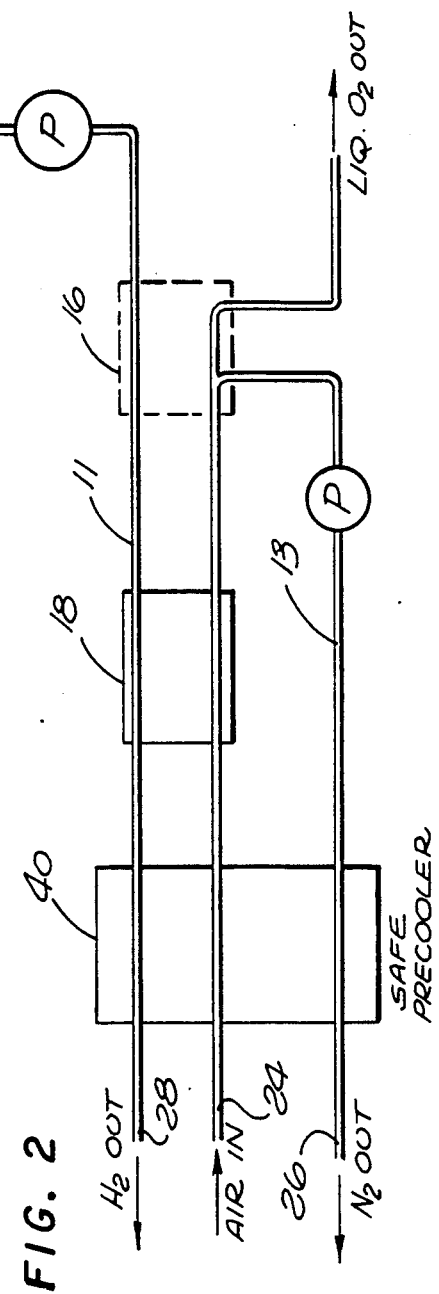

LEAK-SAFE HYDROGEN/AIR HEAT EXCHANGER IN AN ACE SYSTEM

BACKGROUND OF THE INVENTION

1. Field of the Invention

This invention relates to heat exchangers and, more particularly, to a leak-safe Hydrogen/Air heat exchanger wherein liquid hydrogen is used as primary coolant fluid for chilling the high speed air stream of a hypersonic vehicle propulsion system. Modern hypersonic aircraft, to operate at high Mach numbers with liquid hydrogen fuel, are being designed utilizing ram air, chilled to a saturated vapor, or condensed to a liquid, as a source of oxidizer for combustion in the propulsion system. Propulsion systems of this nature are generally referred to as Liquid Air Cycle Engines or LACE, and will be referred to in this disclosure as such.

Other systems that enrich air with oxygen prior to storage or combustion, usually chill the air to a saturated vapor condition before admitting it to an enrichment device. These have been termed Air Collection and Enrichment, or ACE systems. This disclosure assumes that the air is enriched with oxygen, thereby producing a stream of "waste" nitrogen which emerges from the enrichment device as saturated vapor. It has been shown that enriching air with oxygen can significantly improve vehicle mission performance (Ref. U.S. Pat. No. 3,756,024).

Air is approximately 20 percent oxygen and 80 percent nitrogen. It becomes saturated and begins to condense at about 180 degrees Rankine (depending on the pressure), and the saturated waste nitrogen is about 20 degrees colder (again depending on the nitrogen pressure). To obtain maximum performance of this ACE system, it is important to use the cooling capacity of the waste nitrogen as well as that of the hydrogen fuel to chill as much air as possible. In this invention, the waste nitrogen also serves as a safety barrier between the hydrogen and air in the main precooler heat exchanger.

Liquid hydrogen is also used as a refrigerant in the enrichment device before its vapors enter the heat exchanger, subject of this invention, a few degrees colder than the saturated waste nitrogen vapor. There is no possibility of freezing nitrogen or air in the cold end of this heat exchanger.

However, at high flight speeds, in excess of Mach 3.5, the incoming air is above the auto ignition temperature for hydrogen and air (about 1000 degrees Fahrenheit), so that a direct leak between the hydrogen and air streams could cause a catastrophic fire or explosion. Furthermore, at any speed, hydrogen leaking into the air stream will adversely affect the performance of the enrichment device. This invention maintains the benefits of liquid hydrogen to provide refrigeration for the enrichment of air with oxygen and to liquefy the product oxygen while eliminating single failure mixing of leaked hydrogen with the supply air stream.

In the precooler heat exchanger, coaxial tubes are utilized, with cold hydrogen in the central one and inert nitrogen gas in the annulus between them. The inert gas then chills the heat exchanger surfaces contacted by the ram air. Ram air is chilled to its saturated vapor condition, the oxygen extracted for storage or combustion, cold nitrogen for cooling, and the cycle repeated. This process thus uses both the refrigerant capacity and chemical inactivity of saturated nitrogen vapor, an otherwise "waste product" of the liquid air cycle enrichment process, to high advantage, in this invention.

Any leak in the central duct system, mixes hydrogen with inert nitrogen. Any leak in the outer duct system mixes nitrogen and air, no combustion resulting from either type failure.

While the preferred embodiment of this invention is presented as usage in ACE systems with nitrogen gas as the inert fluid, the coaxial tube arrangement presented here is applicable to a variety of systems wherein a primary temperature control fluid, be it for heating or cooling of a working fluid, is reactive with the working fluid. Such systems include those using "liquid sodium/water" heaters in nuclear reactors and for many processes in the chemical industry where highly reactive elements are most efficiently processed with one as temperature controller for the other.

Description of the Prior Art

ACE systems are discussed in U.S. Pat. No. 3,756,024 to A. Gay et al., defining a special arrangement for ACE heat exchangers. Cold nitrogen, in '024 is used as coolant for the ram air in addition to hydrogen in the heat exchangers of a main cooler section. Hydrogen leaks in the '024 main cooler section still pose problems of control and explosive dangers should they be near, or migrate to areas near, high temperature ram air. The inert fluid isolation system of this invention is not present in the engine of '024 but would comprise a major improvement if incorporated into that invention.

A liquid air engine of U.S. Pat. No. 3,775,977, to C. Builder, et al., also utilizes precoolers for incoming air but does not use the combination of cold hydrogen and nitrogen isolation of this invention.

SUMMARY OF THE INVENTION

The leak safe hydrogen/air heat exchanger of this invention provides a plurality of coolant tubes disposed at spaced locations across the air inlet duct of a hypersonic aerospace vehicle. Ram air impacting these tubes is rapidly and progressively chilled so that it becomes the saturated vapor of the gases of which it is comprised.

Tubes used for this "chiller" operation are of a special nature. Each tube has an inner tubular member and an outer one, there being an annulus between them designed for containment of an inert fluid—i.e. one not supporting combustion of hydrogen, the primary fluid transported through the inner tube element, or with air, the fluid being cooled by the outer tube member.

Size of tube elements is a design variable as is the rate of fluid transit and temperatures of working fluid. All parameters of the heat exchanger involved are vehicle dependent and the size and other system parameters are to be set by vehicle mission demands.

The inner tube member contains the primary coolant, which, for the ACE system of this invention, will be cold hydrogen gas. Since hydrogen gas is difficult to contain and hydrogen's temperature range in this application is so stressful on most metals used for its conduits, leaks of hydrogen vapors from the conduit are a continuing threat. To prevent such leaks from allowing mixture of hydrogen with oxygen of the ram air, an envelope of inert fluid such as nitrogen vapor or gas, is maintained around the hydrogen conduit. A leak of the hydrogen duct would provide hydrogen to the inert nitrogen flow while a leak from the nitrogen conduit to the ram air stream would pose no threat of explosion.

The plurality of concentric tubes is arrayed across the vehicle engine's air inlet duct or in a separate heat exchanger for this purpose so that air flowing in that duct comes into such as nitrogen gas, is circulated through the outer tube system, absorbing heat from the hot air impacting its outer surface and transferring some of this heat to the colder hydrogen duct at its center.

After saturation conditions are established, oxygen is separated from the incoming air, liquefied, and routed to storage tanks or combustion chambers, while cold nitrogen and other components are cycled through the heat exchangers for more cooling of the ram air.

Accordingly, it is an object of this invention to provide a hydrogen/air heat exchanger to precool high temperature ram air to liquefaction temperatures using cold hydrogen and nitrogen as primary coolants, while insuring isolation of the hydrogen from the air being cooled.

The above object is achieved through the annular flow of inert gas around the primary coolant conduit as shown in the following drawings of which;

FIG. 1 presents a schematic view of an ACE system using unshielded cold hydrogen conduits for pre-cooling.

FIG. 2 presents a schematic of the ACE system of FIG. 1 modified to provide a leak-safe precooler.

DETAILED DESCRIPTION OF THE PREFERRED EMBODIMENT

Figure 3:
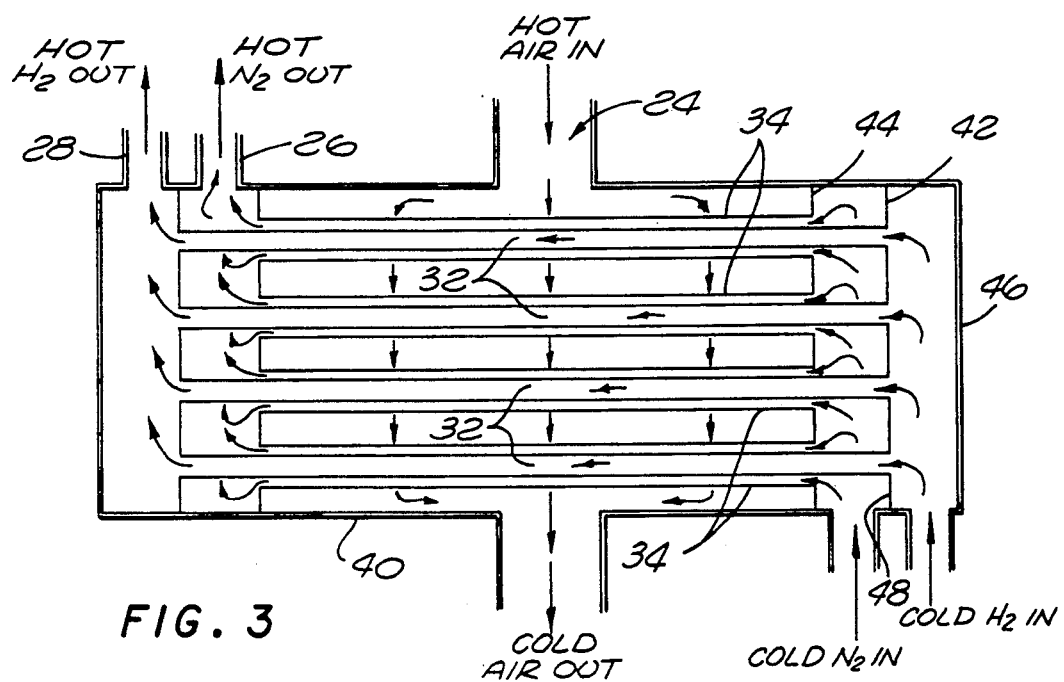
FIG. 3 shows a configuration of a leak-safe hydrogen/air heat exchanger.

FIG. 1 presents a schematic diagram of a typical, current art, ACE system utilizing conventional precoolers 10 and 12 whereby liquid or cold vaporous hydrogen (or alternate cryogen fuel) is circulated from its reservoir 14 through such conditioning equipments as separator 16 and primary cooler 18. Cold hydrogen is routed to equipments 16, 18 in such a fashion that it absorbs heat in a nitrogen reflux condenser in separator 16 and emerges from the separator slightly cooler than the liquid-vapor saturation temperature of nitrogen.

Ram air 24 is admitted to precoolers 10 and 12 combined as heat exchangers 20, 40, from an inlet of the system where cold hydrogen fuel vapor and cold nitrogen gas are used for chilling it in precooler 10. Precooled air is passed through second heat exchanger means 18, where it is chilled to its saturated vapor state and passed on to separator 16.

In separator 16, cold hydrogen gas and proper distillation equipments complete the air separation process and oxygen of the air, liquefied at an appreciably higher temperature than nitrogen, is tapped off and routed to its use terminal 22. Saturated nitrogen vapor, is then pumped to nitrogen precooler 12 where it works in conjunction with hydrogen precooler 10 to chill ram air 24. As more air is liquefied, nitrogen comprising roughly 80 percent thereof, is discharged overboard to generate thrust after use as coolant in precooler 20. Principal advantage of the within invention, schematicized in FIG. 2, is made evident in FIG. 1 by presenting the ram air 24 and cold hydrogen gas conduit 11 as directly interfacing. Leaks in conduit 11 would result in mixing ram air 24 with the hydrogen, forming an explosive mixture.

Figure 4:
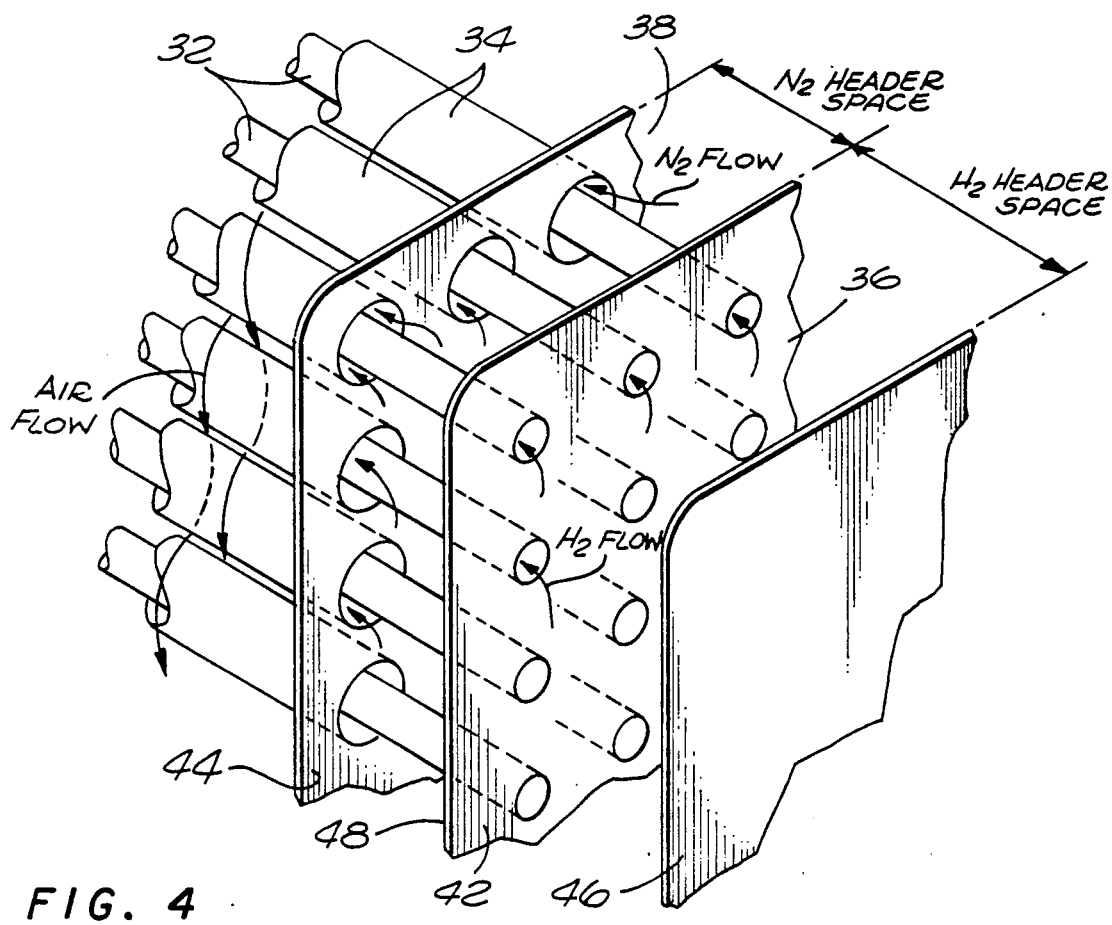
FIG. 4 shows a physical interface of the inlet/outlet manifolds of the FIG. 3 heat exchanger.

FIG. 2 schematicizes a different type of precooler 40. In precooler 40, ram air 24 is passed over a tubular array of cold hydrogen conduits 32 which are encased in tubes of cold nitrogen gas 34 as shown in FIGS. 3 and 4. In precooler 40, manifold 36, cold hydrogen is supplied to inner tube members 32. Manifold 36 has header closure sheet 46 defining one side of the manifold. The alternate side of manifold 36 comprises closure sheet 48 of cold nitrogen manifold 38. Hydrogen tubes 32 originate at inlet sheet 42. Cold hydrogen gas is admitted into manifold 36 through conduits 11 of primary cooler 18 (see FIG. 2). Inlet sheet 42 is also used as header closure sheet 48 of cold nitrogen manifold 38. Hydrogen tubes 32 are fixed leak tight to sheet 42/48 and pass through manifold 38 directly into tubes 34, which are integral with nitrogen inlet sheet 44. Tubes 32 are completely surrounded by nitrogen gas from their beginning at manifold 36, until warm hydrogen at 28 (FIG. 3) is pumped back to the combustion chamber for final propulsion uses. Manifolds 36 and 38 may be of varied configurations and dimensions but a principal feature of this invention is, as shown in FIG. 3, that hydrogen gas is always insulated from ram air 24 by a jacket of nitrogen gas. Fluid pump means such as compressors and centrifugal pumps (not shown) may be used to transport fluids through the ACE/LACE systems. Air 24 flows over outer tube members 34, with cold nitrogen gas flowing in the annular region between tubes 32 and 34. Cold hydrogen gas in tubes 32 chills the nitrogen in tubes 34, while air 24 is chilled on impact with the outer surfaces of tubes 34. A portion of the heat transferred from the ram air is absorbed by the cold nitrogen and the remainder is transferred to the colder hydrogen and the resultant heated nitrogen and hydrogen are ducted to the combustion chamber for propulsion uses.

It is readily seen that any single failure of chiller tubing in precooler 40 will be of the fail-safe type in that hydrogen leaking from tubes 32 will mix with nitrogen of surrounding tubes 34. Leaks of nitrogen from tubes 34 will mix harmlessly with ram air 24 so that explosive hazards of highly reactive hydrogen are greatly reduced through its effective encapsulation by inert nitrogen in precooler tubes 34. System considerations dictate that the hydrogen be at the highest pressure, and that nitrogen pressure be slightly higher than the ram air pressure.

Transference of the technology embodied in precooler 40 is possible to chemical flow processes wherein a primary agent, such as the hydrogen of this disclosure, is used to condition a working compound which is highly reactive with it. An inert substance could be injected between the two for a fail-safe type operation. Such systems are necessary in such operations as liquid sodium to high pressure steam generation. Liquid sodium's use as primary heat source illustrates such use with sodium being highly reactive with water, its high liquid temperatures could be passed through an array of inert material, i.e. material not reactive with sodium or water, helium gas, for example, to achieve the fail safe benefits of this disclosure.

I claim:

1. In the air inlet duct of an ACE propulsion system, a leak-safe hydrogen/air heat exchanger, comprising:

a plurality of generally concentric, spaced apart tubes arrayed across said inlet duct, each of said tubes comprising an inner tube member and an outer tube member with an annular passageway therebetween;

said inner tube member coupled to a source of cold hydrogen and first circulating pump means through first duct means and said outer tube member coupled to a source of inert fluid and second circulating pump means through second duct means;

said outer tube member having an outer surface in thermal exchange relationship with air in said air inlet duct and an inner surface in thermal exchange relationship with inert fluid in said annular passageway;

said inner tube member having an outer surface in thermal exchange relationship with said inert fluid in said annular passageway and an inner surface in thermal exchange relationship with cold hydrogen of said first duct means;

said inner tube member and first duct means isolated from air in said heat exchanger by inert fluid in said annular passageway and said outer tube member.

2. The heat exchanger of claim 1 wherein the inert fluid is nitrogen gas, and including means for separating nitrogen gas from the cold air discharged from said heat exchanger, and recirculating said nitrogen gas as the inert fluid in said annular passageway.

3. An air collection and enrichment system utilizing the heat exchanger of claim 1.

* * * * *